(12) United States Patent
Kubik

(10) Patent No.: US 6,554,755 B2
(45) Date of Patent: Apr. 29, 2003

(54) ROLLER DEVICE

(75) Inventor: Klaus Kubik, Tönisvorst (DE)

(73) Assignee: Eduard Kusters Maschinenfabrik GmbH & Co. KG, Krefeld (DE)

( * ) Notice: Subject to any disclaimer, the term of this patent is extended or adjusted under 35 U.S.C. 154(b) by 0 days.

(21) Appl. No.: 09/867,867

(22) Filed: May 30, 2001

(65) Prior Publication Data

US 2002/0004441 A1 Jan. 10, 2002

(30) Foreign Application Priority Data

| May 30, 2000 | (DE) | ................................. 100 26 883 |
| Sep. 27, 2000 | (DE) | ................................. 100 48 984 |
| Nov. 28, 2000 | (DE) | ................................. 200 20 157 U |

(51) Int. Cl.⁷ .............................................. B23P 15/00
(52) U.S. Cl. ......................................................... 492/46
(58) Field of Search ............................... 492/46; 165/90, 165/136; 219/416; 432/228, 236; 34/124, 125

(56) References Cited

U.S. PATENT DOCUMENTS

| 3,624,353 | A | | 11/1971 | Bjorklund | |
| 4,392,288 | A | * | 7/1983 | Anstotz et al. | ............... 492/10 |
| 4,751,775 | A | * | 6/1988 | Kubik | ............... 492/7 |
| 4,941,247 | A | * | 7/1990 | Kubik | ............... 100/162 B |
| 4,955,120 | A | * | 9/1990 | Brendel et al. | ............... 492/46 |
| 4,962,577 | A | * | 10/1990 | Kubik et al. | ............... 492/15 |
| 5,033,373 | A | * | 7/1991 | Brendel et al. | ............... 100/161 |
| 5,101,544 | A | * | 4/1992 | Kubik | ............... 100/162 B |
| 5,665,043 | A | * | 9/1997 | Hasselberg et al. | ......... 219/211 |
| 5,813,959 | A | * | 9/1998 | Hader et al. | ............... 492/16 |
| 5,885,410 | A | * | 3/1999 | Berkan | ............... 156/359 |
| 5,967,958 | A | * | 10/1999 | Borkenhagen et al. | ...... 162/206 |
| 6,006,806 | A | * | 12/1999 | Marschke | ............... 156/472 |
| 6,045,492 | A | * | 4/2000 | Brendel et al. | ............... 492/20 |
| 6,100,508 | A | * | 8/2000 | Kubik | ............... 219/469 |
| 6,278,094 | B1 | * | 8/2001 | Rindfleisch et al. | ......... 219/619 |
| 6,336,803 | B1 | * | 1/2002 | Funger et al. | ............... 156/580.2 |
| 6,377,778 | B1 | * | 4/2002 | Kikuchi et al. | ............... 219/416 |

FOREIGN PATENT DOCUMENTS

| DE | 296 22 957 | 11/1997 |
| DE | 297 10 620 | 11/1998 |
| DE | 198 13 121 | 10/1999 |
| EP | 0 515 299 | 11/1992 |
| EP | 0 813 632 | 11/1998 |
| GB | 913 455 | 12/1962 |

* cited by examiner

Primary Examiner—I Cuda Rosenbaum
(74) Attorney, Agent, or Firm—Kenyon & Kenyon

(57) ABSTRACT

A roller device is presented that includes a roller with a cylindrical roller body that forms a working roller circumference. The roller, which has a equalization system, is mounted at its ends so as to rotate. The equalization system has tempering devices that are assigned to the roller body. The devices extend over the length of the roller body and act on the roller, which are arranged in a recess of the roller body and by means of which the roller body can be preferentially tempered in a narrow circumference angle region adjacent to a plane that passes through the axis of the roller body.

25 Claims, 7 Drawing Sheets

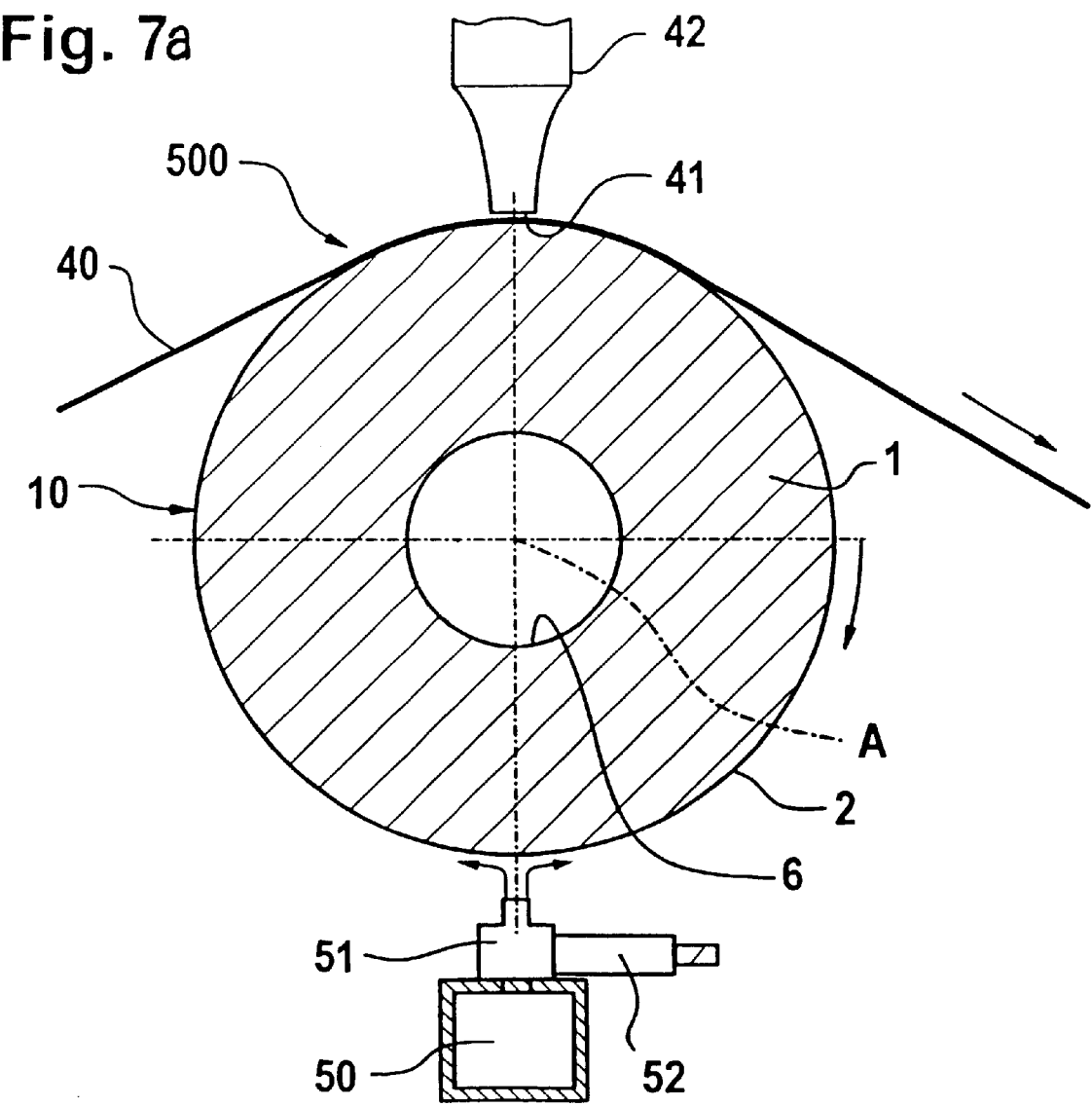

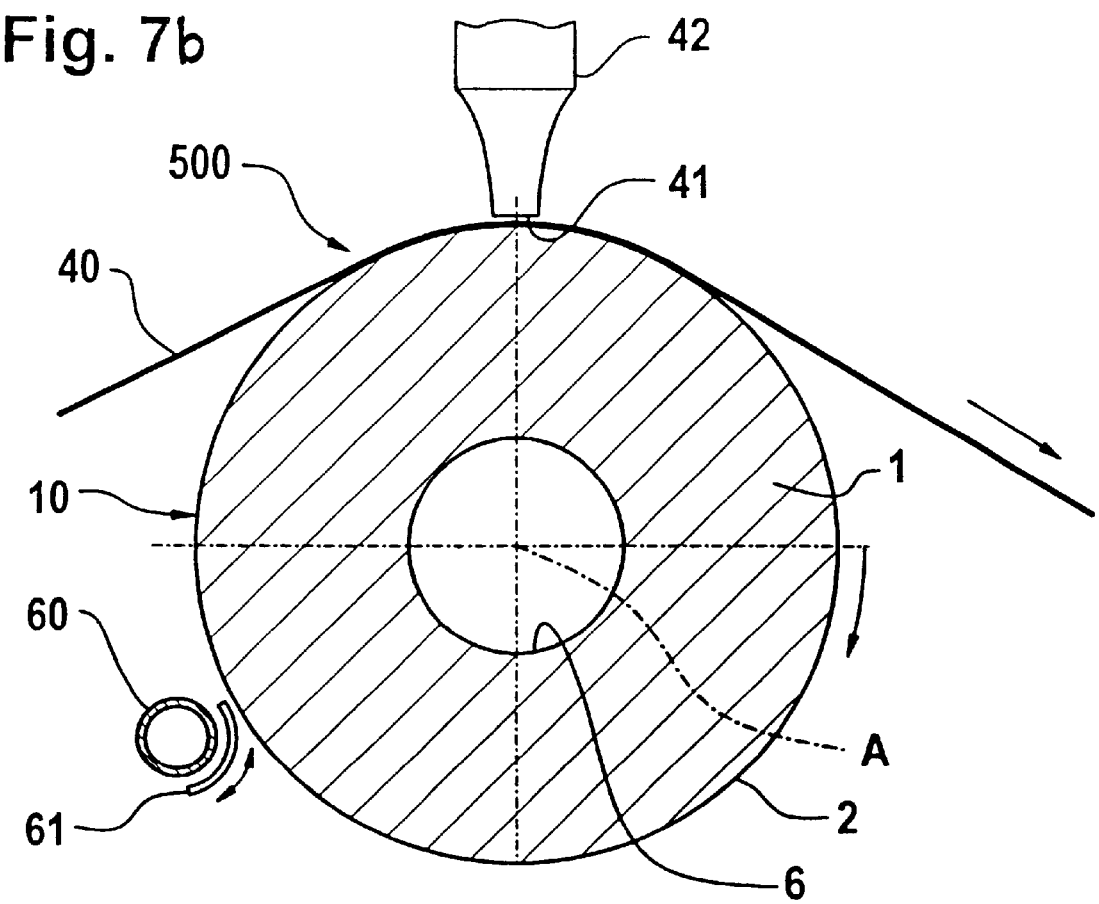

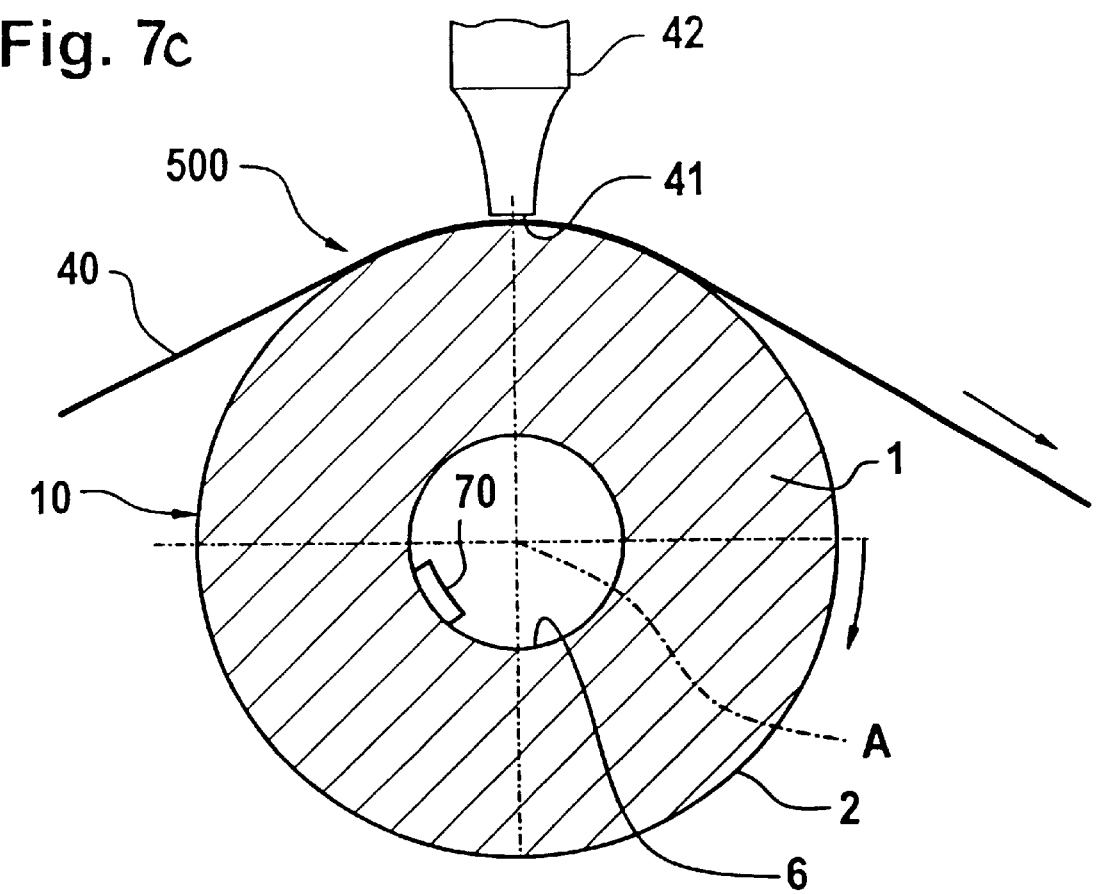

ved with the device according to European Patent
ROLLER DEVICE

FIELD OF THE INVENTION

The invention relates to a roller device that is designed to maintain and improve concentricity.

BACKGROUND OF THE RELATED ART

It is often crucial that rollers used in a variety of machining processes have working circumferences that are highly concentric. A "rolling device" need not only include devices whereby a web-shaped product is treated in interaction with a counter-roller, i.e., between two rollers. There are also cases where only one roller interacts with a fixed counter-element For example, in a system for ultrasound treatment of a web, a moving roller works together with a sonotrode that is radially directed towards it, and the web, which is to be bonded or cut is passed between the two. An example of such an arrangement is described in DE 198 13 121 C1.

An example of a typical roller device, with a heated roller, is known from European Patent 813 632. A heating device is arranged in a cylindrical recess of the roller body, which device serves to increase the temperature at the working roller circumference and thereby to directly influence the treatment of a web that is conducted using the roller. The goal of the known heated roller is to achieve the most uniform possible heating crosswise to the web, i.e., over the length of the roller. For this reason, so-called "peripheral" bores are provided in the roller body, parallel to the axis, located radially outside of the recess. The bores are partially filled with heat carrier fluid and connected with one another at the ends by annular chambers. The heat carrier fluid condenses at colder spots of the peripheral bores making the temperature in the channel system more uniform. Heating takes place in order to bring the roller to a certain temperature that deviates from the ambient temperature, which temperature is practical for the treatment to be conducted.

It is known in the art for it to be possible to adhere to a concentricity tolerance of 5 µm at roller lengths of 2 to 3 m. However, even this accuracy is sometimes not sufficient for a uniform bonding process, and can be the cause for the variations in properties of the finished product. Furthermore, any irregularity that is present tends to become more pronounced in operation. In an ultrasound treatment, when a beat defect moves past the sonotrode, the output transferred to the nonwoven increases at this point on the circumference of the roller, and results in a greater amount of heat introduced into the nonwoven. This results in the non-uniform bonding effect and also results in an increase in the amount of heat transferred to the roller in this circumference region. This in turn results in a preferential temperature increase of the roller in the direction determined by the location of the beat defect, and thereby in an increase in the non-concentricity. The variation in the bonding effect therefore increases on its own over the course of operation.

Non-concentricity on the order of 5 µm, as indicated, is not only attributable to tolerances that exist from the start. Such non-concentricity can also occur later, for example if the roller is given a non-uniform temperature in production, due to some external cause. Even the mere influence of the roller weight itself, when the roller is not moving, can be the cause of slight structural changes that are initiated as a result, leading to non-concentricity on the order indicated, which will increase and build up under the influence of the ultrasound energy transfer.

Thus, in the case of ultrasound treatment systems, the requirements concerning concentricity of the roller are particularly high. This holds especially true for ultrasound bonding of nonwovens made of thermoplastic fibers. Here the ultrasound generator works via the fixed sonotrode, i.e., the ultrasound transmitter, radially against a roller that forms the so-called counter-roller, which carries the bonding pattern in the form of a surface engraving. At the raised parts of the surface engraving, the transfer of ultrasound energy to the nonwoven is particularly intensive, so that here, a preferential temperature increase and preferential melting of the fibers occurs, and in this manner, bonding of the individual threads or fibers of the nonwoven takes place at certain points or along certain lines, in accordance with the pattern, thereby bonding the nonwoven layer.

Even the slightest variations in the distance between the fixed face surface of the sonotrode and the circumference of the moving counter-roller result in a difference in bonding effect. Such a nonwoven demonstrates varying properties that vary with the rhythm of rotation of the counter-roller. For example, this can result in a finished product with a differing feel.

The irregularities as described exist in the circumference direction of the roller, not in the lengthwise direction. If there are temperature differences over the length, these can be combated with the device according to European Patent 813 632, for example, but this device is ineffectual when there are differences in the circumference direction.

The present invention, on the other hand, deals with those deviations that result in bending of the roller body in a plane that passes through the axis, in that the roller body has a slightly higher temperature on one lengthwise side than on the opposite lengthwise side; in this case, it bends like a bimetallic strip, in that the one lengthwise side expands, but the other does not.

However, the effect is not tied to the fact that different temperatures prevail at the opposite lengthwise sides, right from the start. The starting situation for bending that causes non-concentricity can also be a finishing inaccuracy or a structural change, as already mentioned.

The effect to be combated with the invention must also be kept separate from the question whether or not this is a heated roller. The problem according to the present invention can occur both in a heated roller, where any slight temperature differences in the circumference direction are superimposed on the general heating of the roller, and in entirely unheated rollers, where the differences come about as a result of the non-uniform energy introduction of an ultrasound system, for example.

SUMMARY OF THE INVENTION

Proceeding from the problems in the ultrasound bonding of nonwovens as described, the present invention is based on the task of maintaining the greatest possible concentricity of a roller in operation.

This task is accomplished by the present invention which provides a roller device that has a roller. The roller has a cylindrical roller body that forms a working roller circumference of the roller. The roller is rotatably mounted at its end. Also provided is a tempering system assigned to the roller body. The tempering mechanism extends over the length of the roller body and configured to adjust the basic temperature of the roller. An equalization system is provided for preferentially tempering the roller body in a narrow circumference angle region adjacent to a plane that passes through an axis of the roller body.

The means of equalization can fundamentally be a heating means or a cooling means. It is preferred that heat transfer to the roller takes place in a certain direction, seen in the circumference direction, so that the moving roller is non-uniformly heated or cooled, in targeted manner, but not over its length, rather in the circumference direction. With this heat transfer, which takes place only in one direction, i.e., in a zone that is essentially flat or maintains a narrow circumference angle, undesirable lengthwise bending of the roller and the non-concentricity that results from it can be counteracted via the corresponding thermal expansion that is achieved. The bimetallic effect should be canceled out. Therefore, if there is a certain "beat defect," its effect on the circumference of the roller can be reduced, according to the present invention, by heating the opposite side or by cooling the same side. The temperature differences that must be brought about for this purpose amount to only a few degrees, and have nothing to do with the significantly greater temperature differences that are required for normal heating of the roller.

The system can be configured for use in ultrasound treatment systems where very stringent requirements with regard to concentricity are found. In an ultrasound treatment system webs using a sonotrode directed radially against the roller circumference.

The tempering system can, at the same time, be the equalization system. Thus, the equalization system do not have to form a system separate from the tempering system.

The equalization system can be structured in oblong, rod shapes, and be arranged continuous over the length of the roller, parallel to the axis, or distributed uniformly over the circumference. In other words, their structure is similar to that which can be the case for the tempering system responsible for total heating or cooling.

A design structure of the roller device can be a cylindrical recess that is coaxial to the roller circumference at least over a significant part of the length of the working roller circumference. The equalization system are arranged in the interior of the recess. The equalization system can be formed to move with the roller.

However, the system can also be arranged in the interior of the recess so that it does not rotate. Instead it can be activated or deactivated with the rhythm of rotation of the roller. Every time that the "target zone" passes by, the tempering system are therefore switched on, and shut off again immediately afterwards. In this manner, too, preferential heating or cooling of a zone of the roller, delimited in the circumference direction, can be brought about.

Several rod-shaped tempering elements that are parallel to the axis can be provided. These elements can be distributed over the circumference, move with the roller, and can be controlled separately. The roller can have a device for determining the angle location of a concentricity defect assigned to it. Such a device can be linked with a control device, in such a way that the concentricity defect can be countered by individual control of the tempering elements, depending on the location of the concentricity defect.

The roller can be provided with a cylindrical core that has axis-parallel grooves for the tempering elements on its outside circumference.

A set of slip rings can be connected to rotate with the roller, where electrical energy can be supplied separately to the individual tempering elements, using this set of slip rings.

An individual tempering element can be preferentially activated by using corresponding metering of the electrical energy supplied to an individual tempering element, in order to counteract the non-concentricity. For instance, the electrical tempering elements can be activated directly, using the electrical energy supplied to them. In this case, the elements can be electrical heating rods, for example, or cooling rods operated by system of Peltier elements. In another embodiment, a separate feed of the electrical energy is combined with the channels, in that throttle devices that are arranged in the channels can be activated using the electrical energy. These throttle devices influence the flow-through cross-section for a heat carrier medium and therefore the heat transfer output.

In the embodiment described above, several separate rod-shaped tempering elements are provided, distributed over the circumference of the roller.

In another embodiment, the recess has a heat carrier medium flowing through it, which forms the tempering system (which therefore do not necessarily have to be a rigid object). The flow is made non-uniform over the cross-section of the recess, on one side, which also has the result of a targeted, non-uniform heat transfer in the circumference direction, and, in this case, forms the equalization system. Making the flow non-uniform is sufficient to achieve the effect according to the invention, because the required temperature differences amount to only a few degrees.

Making the flow non-uniform can be achieved by a rod-shaped displacement body arranged in the recess, which rotates with the roller, parallel to the axis of the recess; this displacement body can be shifted parallel to itself, in the cross-section of the recess, away from the center. The location of the displacement body in the recess can therefore be adjusted in the circumference direction, depending on the location of the beat defect, and/or adjusted in the radial direction, in order to influence the strength of the effect.

This can be implemented, in terms of design, by having a rod-shaped displacement body guided, at its two ends, in eccentric arrangements that rotate with the roller and can be adjusted in terms of angular position and, if necessary, eccentricity.

In accordance with another embodiment the rod-shaped tempering elements can be formed by a spray pipe through which a fluid heat carrier medium flows, parallel to the axis of the roller, with a linear exit zone that extends along the spray pipe on one side, through which the heat carrier medium can be sprayed out essentially in a plane that goes through the axis, from the inside of the spray pipe against the inside circumference of the recess of the roller body, i.e. against the outside circumference of the body. In one system, the exit zone can be formed of a row of holes, jets, or slits parallel to the axis of the spray pipe. It is practical if the spray pipe, if it is arranged in the recess, is structured so that it can be displaced in the cross-section of the recess, and rotated around its own axis, in order to be able to hit a certain position of the inside circumference of the recess, determined by the position of the beat defect, with the heat carrier medium that is sprayed out.

The effect of the tempering element that serves as an equalization element can be activated and deactivated using a shutter.

In the embodiments described above, the equalization system are provided in a recess of the roller body, i.e. in its interior. It is also possible, however, to arrange the equalization system outside the circumference of the roller body, adjacent to it, and to activate and deactivate them with the rhythm of rotation of the roller. In this case, the required thermal influence on the roller body takes place not from the inside, but rather from the outside. Activation and deactivation during each rotation or after several rotations is necessary, so that the thermal influence is restricted to a certain zone that takes up a small circumference angle, which zone is supposed to bring about the counter-effect to the beat defect that exists in the roller.

The tempering device can also be arranged outside of the roller can be at least one fixed, oblong, axis-parallel tempering element that extends essentially over the length of the roller body.

The drawing schematically shows exemplary embodiments of the invention.

BRIEF DESCRIPTION OF THE DRAWINGS

FIG. 7a shows a side view of an ultrasound bonding system for thermoplastic nonwovens, with a rod-shaped tempering element that acts against the outside circumference of the roller body from the outside;

FIG. 7b shows a side view of an ultrasound bonding system for thermoplastic nonwovens, with another rod-shaped tempering element that act against the outside circumference of the roller body from the outside;

FIG. 7c shows a side view of an ultrasound bonding system for thermoplastic nonwovens, with an electrical tempering element located on the inside circumference of the roller body;

DESCRIPTION OF THE PREFERRED EMBODIMENTS

Figure 1:
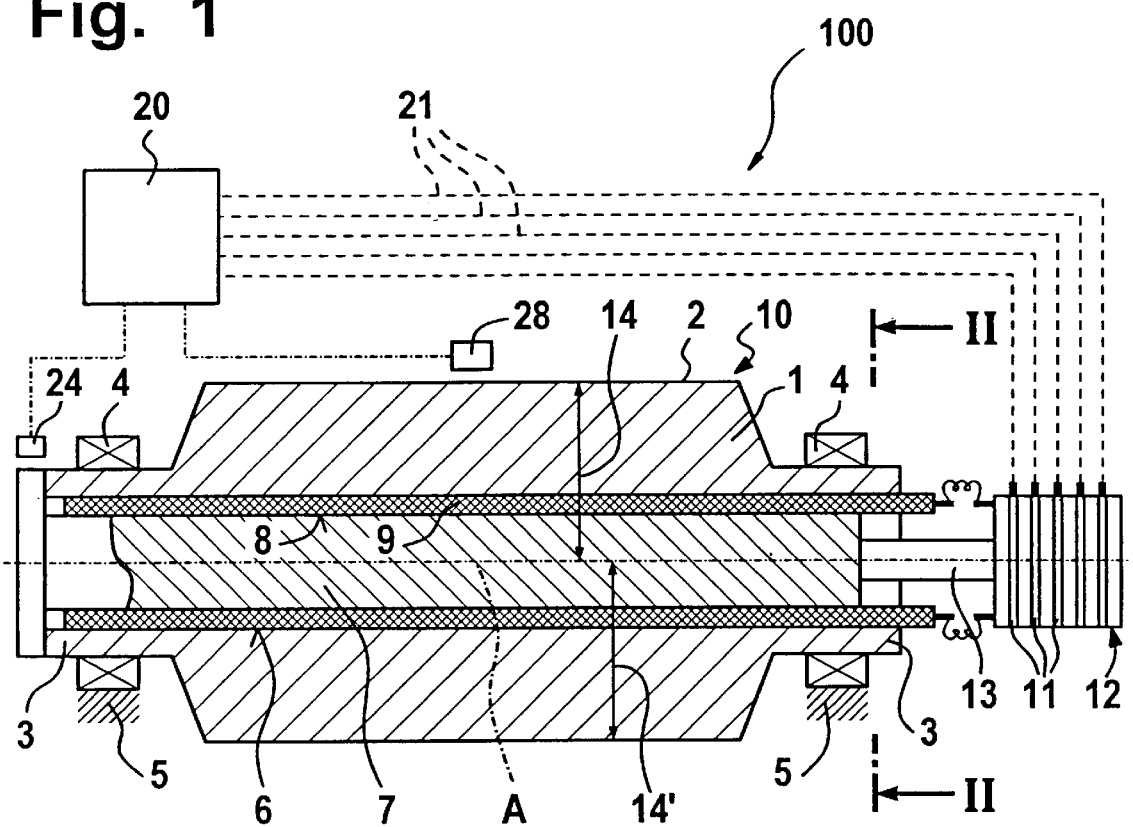
FIG. 1 shows a lengthwise cross-section through a first embodiment of the roller.

The principle of the present invention will be explained using the schematic representation of FIG. 9. The roller, designated as a whole as 10, includes a thick-walled roller body 1 with a central lengthwise bore 6 that passes through it. Roller body 1 can have a length of 2 to 3 m, with a diameter of 30 to 40 cm. According to the present state of the art, machine finishing accuracy allows for tolerances on the order of about 5 μm. In the exemplary embodiment shown schematically in FIG. 9, roller 10 is the counter-roller of an ultrasound treatment system, where the ultrasound effect proceeds from sonotrodes 42, arranged radial to roller body 1, which stand closely opposite roller circumference surface 2 with their faces 41, where web 40 to be treated, for example a web of a thermoplastic nonwoven, is passed through between face 41 and circumference surface 2.

Roller body is shown having a slight initial beat defect (magnified for purposes of illustration), which can lie in the range of the tolerance of 5 μm. This beat defect can be due to machining, but it can also have occurred later, for example due to slight temperature differences or due to structural changes that occurred later, as a result of which roller body 1 has become slightly distorted.

Because of this initial beat defect, roller circumference surface 2 comes slightly closer to face 41 of sonotrode 42 during every revolution of roller 10, and then moves away from face 41 again. In the phase of the closest spacing, the transfer of ultrasound energy to web 40 and also to roller body 1 clearly increases. This transfer is greatly dependent on the distance between face 41 and roller circumference surface 2.

Figure 9:
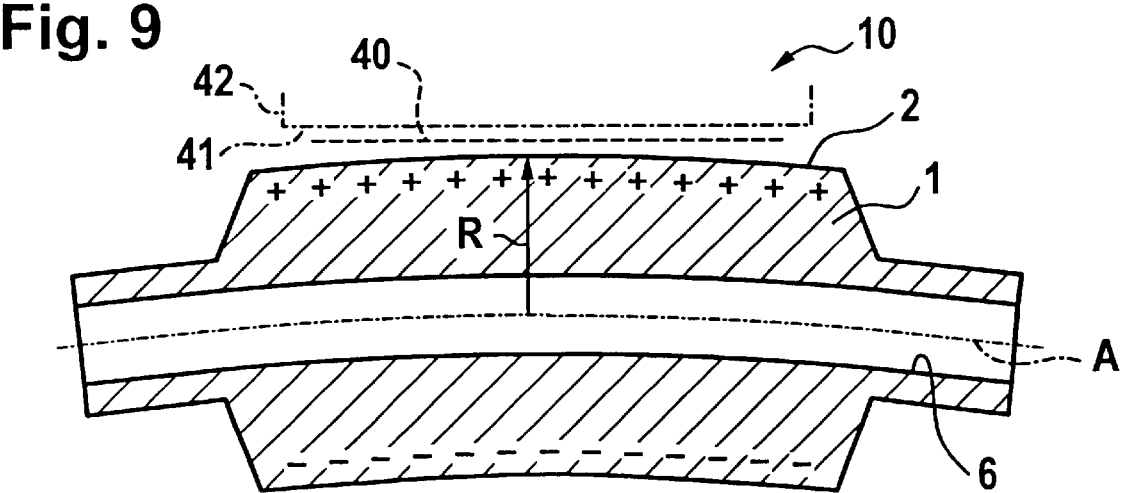
FIG. 9 shows a lengthwise cross-section through a roller that passes through the axis, to explain the principle of the invention.

Therefore, if roller 10 has a slight beat defect towards the top, at some point in time, in accordance with FIG. 9, the transfer of ultrasound energy will preferentially take place in this phase, so that the top of the roller, which has the initial beat defect, is preferentially heated and expands thermally, as is supposed to be indicated by the row of small plus signs at the top edge of the cross-section. The bottom is not affected by this effect, so that the roller as a whole reacts like a bimetallic strip and bends through, as indicated in FIG. 9 with great exaggeration. In reality, this is a change in the radius R of at most a few micrometers, after some period of operation, which has come about by the build-up of temperature. However, such a beat defect is already sufficient to impair proper operation of an ultrasound bonding system for thermoplastic nonwovens, or to even make it impossible. This is because the bonding effect is very much dependent on the specific amount of energy introduced locally. This has the result that the nonwoven is bonded more intensively, in the rhythm of the repeat of a roller revolution, than in the other regions, something that is not acceptable.

Roller 10 in turn can be heated or not. The effect described is independent of this and is superimposed. The goal of the present invention is to reduce the effect.

FIG. 1 shows a roller device for an ultrasound bonding system for thermoplastic nonwovens, indicated as a whole as 100, in detail. It includes roller 10 with roller body 1 with a cylindrical circumference surface that forms working roller circumference 2, the width of which is determined by the width of the web to be treated. Roller body 1 has axially projecting roller journals 3 at both ends, on which roller 10 is mounted via bearings 4 to rotate about axis A, to which working roller circumference 2 is coaxial, in a machine frame 5 that is merely indicated. Roller 10 forms the counter-roller of the ultrasound bonding system, which is provided with the engraving.

In the production of roller 10, the greatest possible accuracy was aimed at, as accurate as can be achieved in terms of machining technology. However, a certain amount of remaining "beat defect" is unavoidable, and builds up even further for the reasons described above, because heat is preferentially introduced on the side that comes closest to the sonotrode, and the roller is heated on one side, which fact is expressed in bending of roller body 1 in a plane that passes through its axis A. In such cases, it is necessary to take additional steps to improve the concentricity, e.g. if roller 10 is used as the counter-roller, provided with the engraving, in the said ultrasound bonding system.

Roller 10 has a device for determining the location of the "beat defect" in the circumference direction assigned to it. This device includes a fixed sensor 28, arranged in the roller stand, to determine the circumference location of the maximum beat defect, i.e. the maximum closeness of working roller circumference 2 to sensor 28. In addition, an angle sensor 24 is provided, which makes it possible to determine the angular location of roller body 1 at which the maximum beat defect determined by sensor 28 is present. The signals of sensor 28 and angle sensor 24 are passed to a control device 20 that processes the signals. On the inside, roller 1 has a cylindrical recess 6 that passes through it, coaxial to axis A, into which a core 7 that matches it in diameter is fitted, which core extends essentially over the length of roller 10. On its outside circumference, core 7 has axis-parallel grooves 8 that extend over its length, in which rod-shaped electrical heating elements 9 are arranged, which extend over the length of roller 10 and are connected with slip rings 11 of a slip ring head, indicated as a whole as 12, at the right end in FIG. 1. Each heating element 9 can be separately supplied with electrical energy, independent of the other heating elements 9 that are present. The electrical energy is passed to the individual slip rings 11 by control device 20, via lines 21. Slip ring head 12 sits on an extension journal 13 of core 7 that projects out of the right end of roller 10 in FIG. 1.

If sensor 28, in combination with angle sensor 24, has determined that roller 10 has a beat defect at the location which lies at the top in FIG. 1, so that distance 14 of working roller circumference 2 from axis A is greater there than the corresponding distance 14' on the opposite side, control device 20 ensures that heating element 9', which is located at the bottom in FIG. 1, is preferentially provided with electrical energy. This causes radial region 14' to be preferentially heated and to undergo a corresponding radial thermal expansion, which counters the "beat defect" at the top and at least partially balances it out. The temperature differences required are not large, since the beat defects to be reduced lie in a range of only $\mu$m. If deformation of the entire roller body is ignored, thermal expansion of a wall thickness of 100 mm, for example, alone already results in an amount of 1.2 $\mu$m per degree of temperature change. The temperature changes in the circumference direction, in order to bring about a sufficient counter-effect to the beat defect, are therefore relatively slight.

The number of four heating elements 9 evenly distributed over the circumference is only a characteristic of the exemplary embodiment. Three or more than four heating elements 9 can also be present, distributed over the circumference.

The four heating elements 9 form equalization system that are supposed to balance out the undesirable bending of the roller body. They do not primarily serve to heat roller body 1. For this purpose, separate heating devices, not shown in FIGS. 1 and 2, can be used, which use larger amounts of heat than required to balance out the undesirable bending.

If functionally equivalent parts are present in the following embodiments, the same reference numbers will be used.

Figure 3:
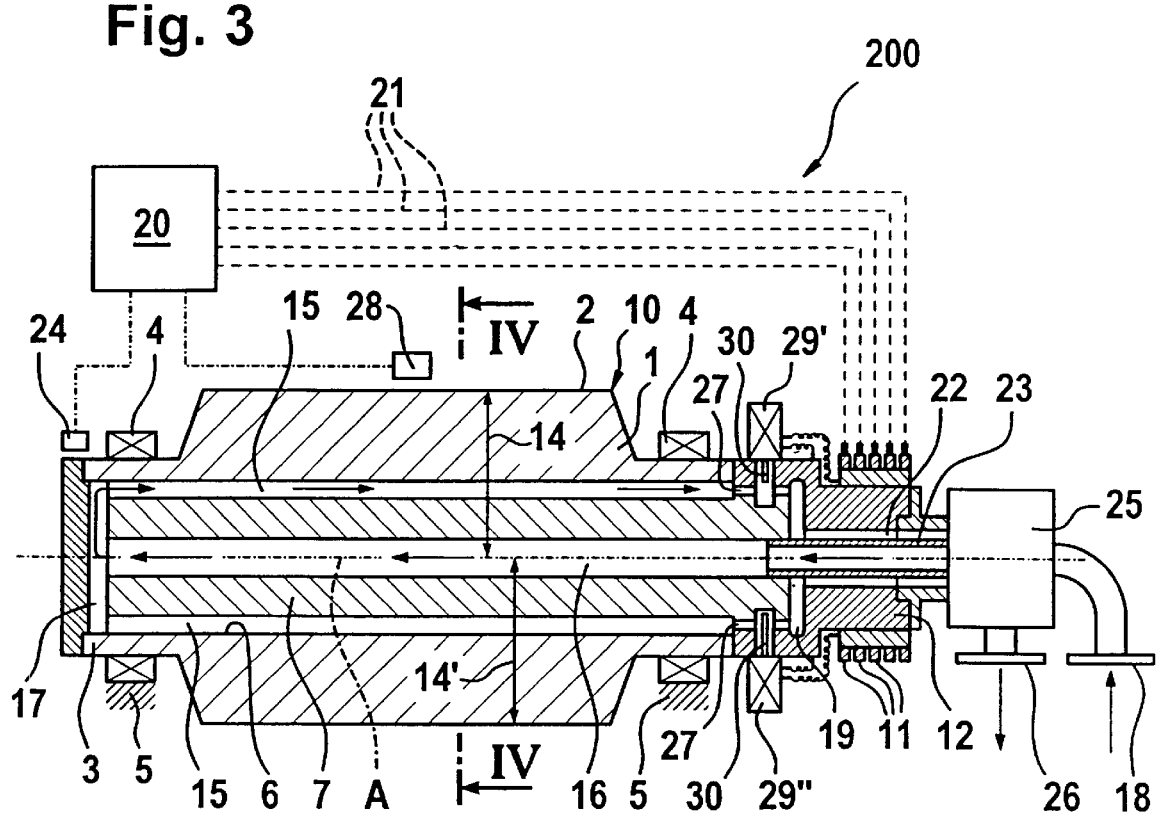
FIG. 3 shows a lengthwise cross-section through a second embodiment of a roller according to the present invention.
Figure 4:
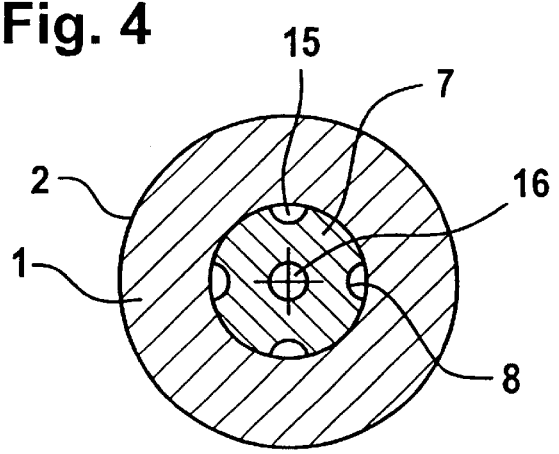
FIG. 4 shows a cross-section approximately along line IV—IV in FIG. 3.

Roller device 200 in FIG. 3 differs from roller device 100 in that no electrical heating elements are present in grooves 8 of core 7, rather grooves 8 form channels 15 that are open towards the inside circumference of recess 6 and are closed off by this circumference. A fluid heat carrier medium, for example a heat carrier oil, can flow through channels 15, in the one direction along the axis of roller body 1. Furthermore, core 7 has a central bore through which the heat carrier medium can flow in the opposite direction, for example from right to left in FIG. 3, in order to exit at the left end of roller body 1 and pass over into outer channels 15 in transition chamber 17 that is formed there. Of course, the flow directions can also run in the opposite direction.

In roller arrangement 200, the heat carrier oil is supplied at inlet 18 and enters into rotary connection 25, where it is passed into feed pipe 23, which rotates with the roller and is inserted into central bore 16, and subsequently into central bore 16. At the right end of roller body 1, again, a transition chamber 19 is formed, into which the heat carrier oil that is returning into channels 15 enters, where is it deflected radially inward, in order to pass into a channel 22 in the shape of a hollow cylinder, which goes through slip ring head 12 and is adjacent to feed pipe 23 radially on the outside; this channel, again, leads back to rotary connection 25, from which the heat carrier oil can be tapped at fixed drain outlet 26.

On the side located towards working roller circumference 2 with reference to transition chamber 19, valves 29', 29" that generate a throttle effect are arranged in connecting channels 27, formed in slip ring head 12, to channels 15; they can partially or completely close the flow cross-section for the heat carrier oil that is flowing back in transition channels 27, by using a radial slide 30. Valves 29', 29" are controlled by slip ring 11 arranged on slip ring body 12, specifically as a function of the location of the beat defect of roller body 1.

If a specific channel 15 is more or less closed by using related valve 29', 29", the amount of heat carrier oil flowing through this channel decreases, so that no heating or cooling takes place in this region any longer, and the non-uniform heating effect that is aimed at, seen over the circumference, comes about. The heat carrier oil can be heated or cooled; the location of the channel 15 that is to be blocked at least partially must be chosen accordingly. It is understood that instead, all channels 15 except for one can be closed and the one alone can be charged with heat carrier oil. The location of the blocked or open channels depends on whether the heat carrier oil is heated or cooled and where the beat defect to be combated is located, seen in the circumference direction.

In this case, channels 15, i.e. the heat carrier oil that flows in them, can simultaneously be the tempering system by which the basic temperature of the roller body is adjusted, as well as forming the equalization system by which undesirable, slight bending of the roller body can be combated. In addition, it should be stated that it is not necessary to use heat carrier oil that lies above the ambient temperature; instead, a cooling heat carrier medium or cooling rods can also be used. The adjustment of tempering on which the present invention is based includes both possibilities.

Figure 2:
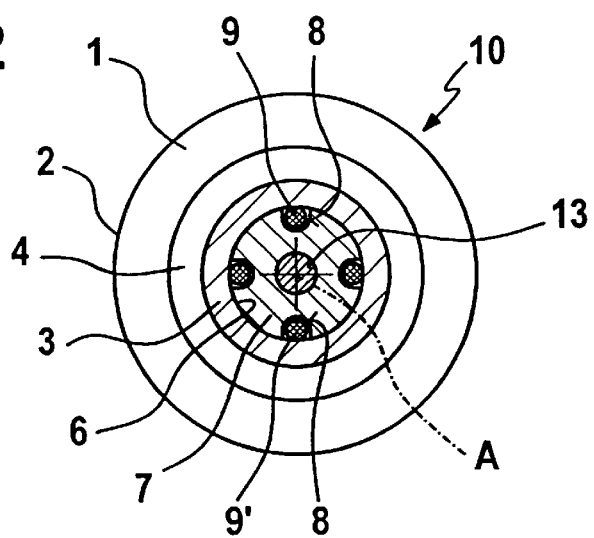
FIG. 2 shows a cross-section approximately along line II—II in FIG. 1.
Figure 5:
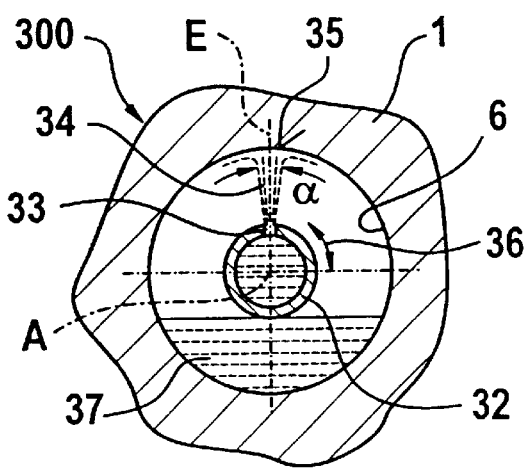
FIG. 5 shows a partial cross-section through a roller with a spray pipe arranged in the recess of the roller body.

FIG. 5 shows a partial cross-section through a roller device 300, where roller body 1 has a central recess 6 and thereby corresponds to roller device 100 of FIGS. 1 and 2, but without core 7 and heating elements 9. A centered spray pipe 32 passes through recess 6 of roller device 300, over its length, which pipe has an axis-parallel row of holes or slits 33 on one side, through which a knife-like jet 34, or one that takes up only a small circumference angle, of a fluid heat carrier medium can be directed against a location 35 on the inside circumference of recess 6. A plane E is determined by the location of the beat defect and axis A, and jet 34 extends in an angle region a, preferably symmetrical on both sides of plane E, widening towards the outside. In any case, a is clearly below 180°, preferably under 30°. Spray pipe 32 rotates with roller body 1, but can be adjusted, in the direction of arrow 36, in terms of its rotating position in the direction of the arrow, and, if necessary, also in terms of its position in the cross-section of recess 6, in order to adapt to the necessary location of impact point 35.

Roller body 1 is preferentially heated or cooled in the circumference region of location 35 (depending on whether the fluid heat carrier medium is heated or cooled), which makes it possible to counteract a beat defect. Fluid heat carrier medium 37 that exits from row 33 of holes or slits, which collects in recess 6 between the outside circumference of spray pipe 32 and the inside circumference of recess 6, is continuously drawn off.

It is understood that this embodiment is suitable only as equalization system, because it is not capable of producing a heating effect that is uniform over the circumference.

Figure 6:
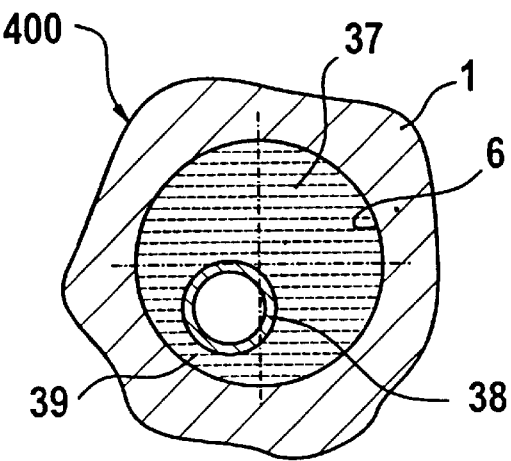
FIG. 6 shows a corresponding partial cross-section with a pipe-shaped displacement body arranged on one side.

In the case of roller device 400 of FIG. 6, recess 6 of roller body 1 is filled with fluid heat carrier medium 37 that is pumped through in the lengthwise direction of the recess. A displacement body 38, in the form of a pipe, is arranged outside the center of recess 6, parallel to its axis, but off-center, which body influences the heat transfer to the inside circumference of recess 6 in such a way that in the region of narrow part 39 between inside circumference 6 and pipe-shaped displacement body 38, it deviates from the remaining circumference of recess 6. The displacement body rotates with roller body 1, so that the narrow part always remains at the same location of the roller body, seen in the circumference direction.

The location of displacement body 38 in the cross-section of recess 6 is adjustable, in order to be able to counteract the beat defect. The non-uniformity of heat transfer to the inside circumference of recess 6 that is possible as a result of the eccentric position of displacement pipe 38 is sufficient to bring about a sufficient thermal expansion of the roller body, localized in the circumference direction, that counters a beat defect. Heating does not have to take place with a high energy concentration, since, as already mentioned, the non-concentricity values and the corresponding thermal expansion values to be generated on the opposite side are on the order of only a few μm.

Roller device 500 of FIGS. 7a, 7b, and 7c is an ultrasound bonding system where a web-shaped nonwoven 40 made of thermoplastic fibers is passed through between the circumference of a roller 10 and face 41 of a sonotrode 42 that acts radially against the circumference of roller 10 and transfers the ultrasound energy. On its circumference surface 2, which forms a cylindrical sheathing surface, roller 10 has a certain relief that determines the bonding pattern.

In this exemplary embodiment, making the temperature non-uniform in order to counteract a beat defect is done radially from the outside, acting on roller body 1. As shown in FIG. 7a, a channel 50 for a gaseous heat carrier medium, for example heated or cooled compressed air, which extends along the roller body, is provided. Along channel 50, at its top, jets 51, which are adjacent to one another and directed against the outside circumference of roller body 1, are lined up; they can be activated by solenoid valves 52. Therefore, if roller body 1 according to FIG. 7a has a beat defect towards the bottom, in other words possesses a greater radius in the bottom region, jets 51 are all opened at the same time when the bottom region of roller body 1 passes by them. During the further rotation of roller body 1, jets 51 are immediately closed again, so that the effect of the fluid heat carrier medium in channel 50 can be felt only on part of the circumference of roller body 1. Opening and closing of jets 51 is controlled by a control device that corresponds to control devices 20 in FIGS. 1 and 3, and receives its signals from a corresponding fixed sensor arrangement 24, 28.

Instead of channel 50, as shown in FIG. 7b, a different tempering element 60 that extends in rod shape along roller body 1 can also be provided. However, such a tempering element only has the desired effect if it can be activated and deactivated with a frequency corresponding to the speed of rotation of roller body 1. A pipe through which heat carrier medium flows would normally be too slow for this purpose. However, if rod-shaped tempering element 60 is structured as an inductive electrode, sufficiently rapid activation and deactivation and therefore a limitation of the effect to a certain circumference region of roller body 1 can be successful.

Activation and deactivation can also be brought about by a shutter 61 that can be brought between tempering element 60 and roller circumference 2 with the rhythm of rotation of roller 10, approximately as indicated in FIG. 7b, or in the form of a pipe slit along its length, which rotates around tempering element 60. In such a case, tempering element 60 can also be a pipe through which a heat carrier oil flows, or a rod-shaped electrical tempering element. A shutter 61 can be provided for tempering elements arranged outside or inside recess 6.

FIG. 7c indicates yet another alternative: An electrical tempering element 70 is located on the inside circumference of recess 6; its position in the circumference direction can be adjusted, depending on the location of the beat defect, and it rotates with roller 10.

Figure 8:
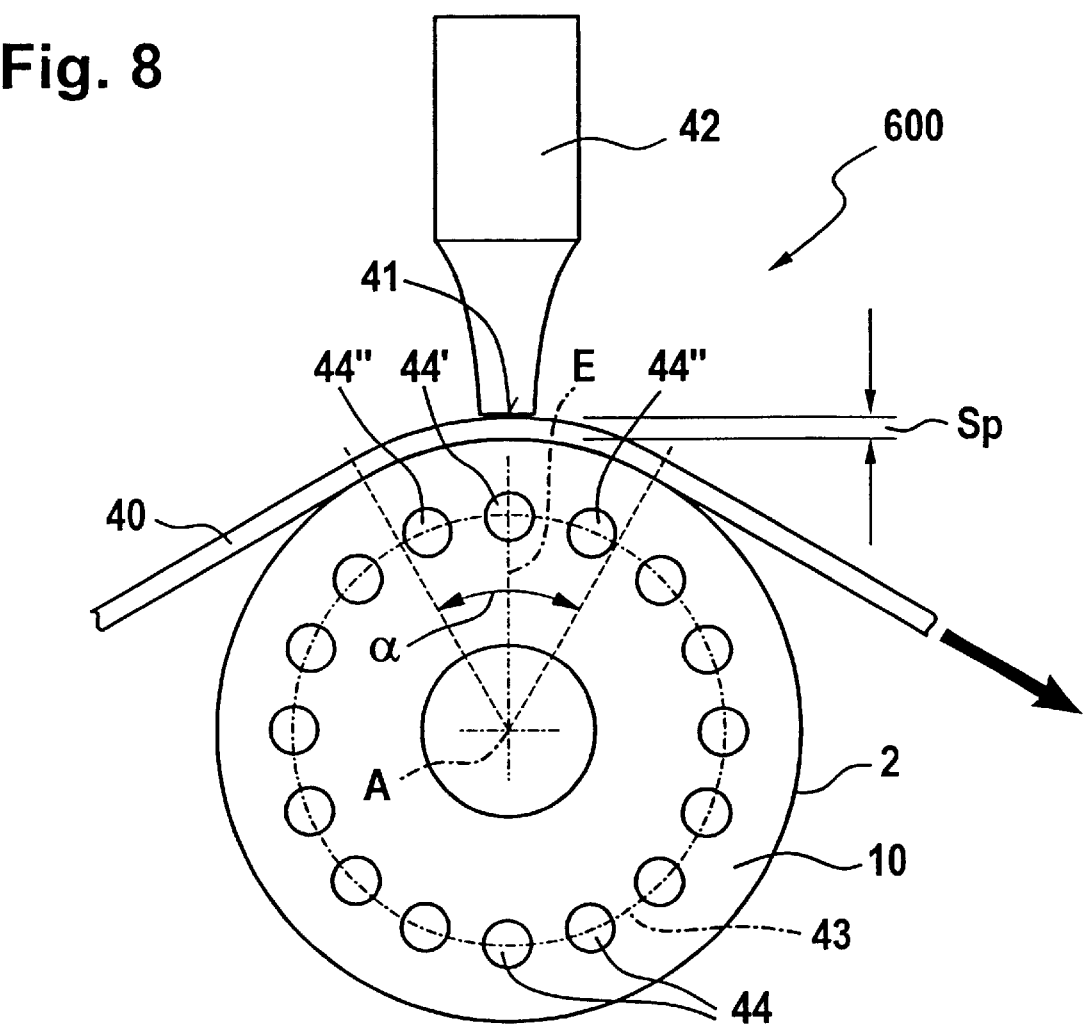
FIG. 8 shows a side view of an ultrasound bonding system for a nonwoven.

Finally, FIG. 8 shows an exemplary embodiment 600 of an ultrasound bonding system, where roller 10 serves as a counter-roller, in accordance with FIG. 7. Web 40 is passed through gap Sp between face 41 of sonotrode (or sonotrodes) 42 and circumference surface 2 of the roller, and there it is exposed to the ultrasound effect. Roller body 1 has a number of peripheral bores 44, uniformly distributed over an arc 43, through which a fluid tempering medium can be passed in the direction of the roller axis. In exemplary embodiment 600, the fluid tempering medium is a cooling fluid, but it is not passed through all peripheral bores 44 at the same time, but rather only through peripheral bore 44' that lies adjacent to the top bend apex, or a few peripheral bores 44" that in turn are adjacent to the said bore.

In other words, cooling takes place only on the lengthwise side on which roller body 1 has bent through towards the top. In this way, this region experiences thermal contraction that counters the bending.

Cross-sectional diagrams of rollers, according to FIG. 8, are known for tempered rollers if the heat carrier fluid that is passed through the peripheral bores is supposed to provide the entire heating of the roller. Then, however, the peripheral bores lie approximately in the middle of the wall thickness, i.e. not too close to circumference surface 2, so that the greater distance over which the heat must pass results in uniformity of the temperature at circumference surface 2.

In exemplary embodiment 600, however, arc 43 has a greater diameter and the peripheral bores lie closer to this circumference surface. The intention is specifically to bring about non-uniformity and to preferentially impact an oblong zone, the location of which is determined by bending of roller body 1. Therefore peripheral bores 44 are located quite close to the circumference surface, so that the non-uniformity can still be felt at the circumference.

What is claimed is:
1. A roller device comprising:
   a roller, having a cylindrical roller body that forms a working roller circumference of the roller, the roller rotatably mounted at ends of the roller;
   a tempering mechanism assigned to the roller body, the tempering mechanism extending over a length of the roller body, the tempering mechanism configured to adjust a basic temperature of the roller; and
   an equalization mechanism for tempering the roller body in a narrow circumference angle region adjacent to a plane that passes through an axis of the roller body so as to cause the temperature of the roller body to be non-uniform around the working roller circumference.

2. The roller device according to claim 1 wherein the roller experiences one-sided tempering in a circumference angle region adjacent to a plane that passes through the axis of the roller body, the equalization mechanism configured so that the one-sided tempering is extended over the length of the roller body.

3. The roller device according to claim 2, wherein the planes of the one-side tempering system and of the equalization system coincide, and a temperature effect caused by the equalization system is counter to a temperature effect caused by the one-side tempering.

4. A roller device comprising:
   a roller, having a cylindrical roller body that forms a working roller circumference of the roller, the roller rotatably mounted at ends of the roller;
   a tempering mechanism assigned to the roller body, the tempering mechanism extending over a length of the roller body, the tempering mechanism configured to adjust a basic temperature of the roller; and
   an equalization mechanism for tempering the roller body in a narrow circumference angle region adjacent to a plane that passes through an axis of the roller body so as to cause the temperature of the roller body to be non-uniform around the working roller circumference, wherein the roller configured for use in an ultrasound treatment device for the treatment of flat goods, where goods are passed between at least one sonotrode and the roller, whereby the roller acts as a counter-tool.

5. A roller device comprising:
   a roller, having a cylindrical roller body that forms a working roller circumference of the roller, the roller rotatably mounted at ends of the roller;
   a tempering mechanism assigned to the roller body, the tempering mechanism extending over a length of the roller body, the tempering mechanism configured to adjust a basic temperature of the roller; and
   an equalization mechanism for tempering the roller body in a narrow circumference angle region adjacent to a plane that passes through an axis of the roller body so as to cause the temperature of the roller body to be non-uniform around the working roller circumference, wherein the tempering mechanism coincides with the equalization system for tempering the roller body in a narrow circumference angle region adjacent to the plane that passes through the axis of the roller body.

6. A roller device comprising:
   a roller, having a cylindrical roller body that forms a working roller circumference of the roller, the roller rotatably mounted at ends of the roller;
   a tempering mechanism assigned to the roller body, the tempering mechanism extending over a length of the roller body, the tempering mechanism configured to adjust a basic temperature of the roller; and
   an equalization mechanism for tempering the roller body in a narrow circumference angle region adjacent to a plane that passes through an axis of the roller body so as to cause the temperature of the roller body to be non-uniform around the working roller circumference, wherein the equalization system includes structured in rod-shaped channels arranged parallel to the axis of the roller body, the channels positioned over the entire length of the roller body and distributed uniformly relative to the circumference of the roller body.

7. A roller device comprising:
   a roller, having a cylindrical roller body that forms a working roller circumference of the roller, the roller rotatably mounted at ends of the roller;
   a tempering mechanism assigned to the roller body, the tempering mechanism extending over a length of the roller body, the tempering mechanism configured to adjust a basic temperature of the roller; and
   an equalization mechanism for tempering the roller body in a narrow circumference angle region adjacent to a plane that passes through an axis of the roller body so as to cause the temperature of the roller body to be non-uniform around the working roller circumference, wherein the equalization system includes electrical tempering elements.

8. A roller device comprising:
   a roller, having a cylindrical roller body that forms a working roller circumference of the roller, the roller rotatably mounted at ends of the roller;
   a tempering mechanism assigned to the roller body, the tempering mechanism extending over a length of the roller body, the tempering mechanism configured to adjust a basic temperature of the roller; and
   an equalization mechanism for tempering the roller body in a narrow circumference angle region adjacent to a plane that passes through an axis of the roller body so as to cause the temperature of the roller body to be non-uniform around the working roller circumference, wherein the equalization system includes channels through which a fluid heat carrier medium flows.

9. A roller device comprising:
   a roller, having a cylindrical roller body that forms a working roller circumference of the roller, the roller rotatably mounted at ends of the roller;
   a tempering mechanism assigned to the roller body, the tempering mechanism extending over a length of the roller body, the tempering mechanism configured to adjust a basic temperature of the roller; and
   an equalization mechanism for tempering the roller body in a narrow circumference angle region adjacent to a plane that passes through an axis of the roller body so as to cause the temperature of the roller body to be non-uniform around the working roller circumference, wherein the roller body has a cylindrical recess on an inside of the roller body extending at least over a significant part of a length of the working roller circumference, the recess being coaxial to an axis of the roller body, and wherein the equalization system is arranged inside the recess.

10. The roller device according to claim 9, wherein the equalization system is configured to rotate with the roller body.

11. The roller device according to claim 9, wherein the equalization system is stationary with respect to the roller body, the equalization system being activated and deactivated corresponding to a rhythm of rotation of the roller body.

12. The roller device according to claim 9, further comprising a sensor device for determining an angular position of a concentricity error, the sensor device operably connected to a control device so that the concentricity error can be countered by separate control of the equalization system according to the position of the concentricity error.

13. The roller device according to claim 12, wherein a cylindrical core essentially fills the recess of the roller body and rotates with the roller body, the core having axis-parallel grooves on an outside circumference of the core for tempering elements of the equalization system.

14. The roller device according to claim 7, further comprising a slip ring set connected to rotate with the roller body, the slip ring set configured to individually supply electric energy to the tempering elements of the equalization system.

15. The roller device according to claim 14, wherein the tempting elements are directly acted upon by electrical energy.

16. The roller device according to claim 14, further comprising throttle devices that are assigned to channels of the equalization system, wherein the throttle devices are activated by the electrical energy.

17. The roller device according to claim 9, further comprising a heat carrier medium that forms the tempering system, wherein the heat carrier medium flows through the recess, the flow configured to be non-uniform on one side, over the cross-section of the recess.

18. The roller device according to claim 17, wherein a rod-shaped displacement body is arranged in the recess parallel to an axis of the recess, the body being non-coaxial relative to the axis of the recess.

19. The roller device according to claim 18, wherein the rod-shaped displacement body is guided, at two ends, in rotating eccentric arrangements adjusted with regard to angle position and eccentricity.

20. The roller device according to claim 10, wherein the roller devices include rod-shaped tempering elements that are formed by a spray pipe parallel to the axis of the roller body, the spray pipe configured to carry a fluid heat carrier medium, the pipe having a linear exit zone, extending along the spray pipe, through which heat carrier medium is sprayed out essentially in a plane that passes through the axis of the roller device in a narrow angle region adjacent to the plane, the heat carrier medium being sprayed against an inside circumference of the recess.

21. The roller device according to claim 20, wherein the exit zone is formed by at least one of a row of holes, jets, and slits.

22. The roller device according to claim 20, wherein the spray pipe has a pipe axis, the pipe configured to rotate about the pipe axis.

23. The roller device according to claim 6, further comprising a shutter that essentially extends over the length of the roller body, the shutter configured to be interposed between a tempering element of the equalization system and the roller body in a rhythm of rotation of the roller body, the shutter configured to activate and deactivate a temperature effect of the tempering element on the roller.

24. The roller device according to claim 6, wherein the equalization system is arranged outside a circumference of the roller body and adjacent to the roller body, the system configured to be activated and deactivated in a rhythm of rotation of the roller.

25. The roller device according to claim 24, wherein the device includes at least one fixed, oblong, axis-parallel tempering element that extends essentially over the length of the roller body.

* * * * *